United States Patent [19]

Martin et al.

[11] Patent Number: 4,839,407
[45] Date of Patent: Jun. 13, 1989

[54] PARTICULATE POLYACETAL CARBOXYLATE AND METHODS FOR PREPARATION THEREOF

[75] Inventors: David A. Martin, Ballwin; Edward L. Ries, Kirkwood; William Vanderlinde, Creve Coeur; Marvin J. Young, St. Charles, all of Mo.

[73] Assignee: Monsanto Company, St. Louis, Mo.

[21] Appl. No.: 153,118

[22] Filed: Feb. 8, 1988

[51] Int. Cl.⁴ .............................................. C08L 59/00
[52] U.S. Cl. .................... 524/389; 427/220; 427/221; 528/230; 528/238; 528/239
[58] Field of Search ............... 524/389; 528/230, 238, 528/239; 427/220, 221

[56] References Cited

U.S. PATENT DOCUMENTS 4,140,676  2/1979  Crutchfield et al. .............. 528/231
4,144,226  3/1979  Crutchfield et al. .............. 528/231

*Primary Examiner*—Maurice J. Welsh
*Attorney, Agent, or Firm*—Raymond C. Loyer; Arthur E. Hoffman; Arnold H. Cole

[57] ABSTRACT

A method for preparation of solid particulate polyacetal carboxylate. The method comprises agglomerating a solution comprising less than about 1% by weight methanol and between about 30% by weight and about 60% by weight polyacetal carboxylate onto a substrate to produce a free-flowing particulate solid. The solid comprises between about 30% by weight and about 55% by weight polyacetal carboxylate. The polyacetal carboxylate corresponds to the formula:

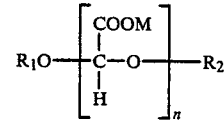

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain.

45 Claims, No Drawings

PARTICULATE POLYACETAL CARBOXYLATE AND METHODS FOR PREPARATION THEREOF

BACKGROUND OF THE INVENTION

This invention relates to polyacetal carboxylate compositions that are useful as detergent builders, and more particularly to the preparation of particulate polyacetal carboxylate by agglomeration.

Polyacetal carboxylate, or polymeric acetal carboxylate, ordinarily comprises a mixture of polymeric acetal carboxylates of various chain lengths. Thus, polyacetal carboxylate useful as a detergent builder generally corresponds to the formula

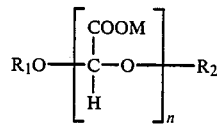

where n is at least 4, preferably between about 10 and about 400, and represents the average chain length of the polyacetal carboxylate in the mixture, $R_1$ and $R_2$ are stabilizing end groups, and M is an alkali metal, ammonium, an alkyl group of 1 to about 4 carbon atoms, a tetraalkyl ammonium group, or an alkanolamine group having from 1 to about 4 carbon atoms in the alkyl chain. Polyacetal carboxylate is incorporated in dry detergent formulations as a builder for chelation or sequestration of metal ions ordinarily found in tap water. Such polyacetal carboxylate, or "polymeric acetal carboxylate", is described in more detail in U.S. Pat. No. 4,144,226 to Crutchfield et al.

By chelating or sequestering metal ions such as calcium, magnesium, zinc, lead, copper and cadmium ions, the builder softens the water, thereby improving the effectiveness of the detergent. Such detergent formulations are adapted for employment by consumers for a number of end uses, including automatic dishwashing and laundering of clothing. In addition to a surfactant and builder, detergent formulations typically contain other ingredients such as alkalis, dyes, perfumes and the like. Ordinarily, a solid, particulate mixture of polyacetal carboxylate, sodium carbonate and water, generally in the form of water of hydration, is added to the detergent. A typical polyacetal carboxylate mixture contains between about 76% by weight and about 82% by weight polyacetal carboxylate such as sodium polyglyoxylate, between about 0.2% by weight and about 1% by weight monomeric glyoxylate, between about 6% by weight and about 12% by weight water and other volatiles, between about 2% by weight and about 5% by weight sodium carbonate, between about 0.5% by weight and about 1.5% by weight oxalate salt, and trace amounts of sodium glycolate and sodium formate.

In commercial detergent formulation practice, a builder such as polyacetal carboxylate may be incorporated by dry mixing of particulate polyacetal carboxylate, or polyacetal carboxylate mixture, with particulate detergent, but this process does not always provide a product in which the polyacetal carboxylate is uniformly distributed, or in which initial uniformity of distribution is maintained during storage and shipment. A uniform polyacetal carboxylate/detergent mixture is desirable so that the consumer obtains a proper proportion of builder to detergent each time a portion of the mixture is scooped out of, or poured from, a box of the detergent mixture. However, when produced by conventional precipitation processes, particulate polyacetal carboxylate includes a large proportion of very small, dust-like particles, and sometimes also includes relatively over-sized particles, which results in segregation of the polyacetal carboxylate from the detergent in the box. Polyacetal carboxylate particles that are substantially smaller than the particles of detergent tend to fall to the bottom of the detergent box. If any polyacetal carboxylate particles are substantially larger and less dense than the detergent particles, such particles tend to rise to the top of the box. Therefore, there is a need for a relatively inexpensive method for preparation of polyacetal carboxylate in the form of particles of substantially uniform size, on the order of the size of the detergent granules with which the polyacetal carboxylate is to be mixed.

Conventionally, polyacetal carboxylate is prepared from a slurry as produced, for example, by the saponification process disclosed in U.S. Pat. No. 4,140,676 to Crutchfield. The polyacetal carboxylate is prepared from the slurry by precipitation with methanol. The preciptate is centrifuged, and then washed and dried. If a dynamic drying process is used, the dry centrifuge cake is generally of such small particle size that it is added directly to the dry detergent formulation. But if a static drying process is employed, the cake must be milled before addition to the dry detergent formulation. These conventional procedures, however, involve several drawbacks. As noted, these methods for preparing particulate polyacetal carboxylate produce a significant amount of very small, dust-like particles which settle to the bottom of a box of detergent. Removal of the dust-like particles by sieving prior to addition of the particulate polyacetal carboxylate mixture to the detergent mixture results either in excessive waste of polyacetal carboxylate, or in an expensive recycle process involving re-wetting and drying of the recycled dust-like particles to produce larger particles. Dynamic drying sometimes also results in the formation of undesirably large particles. Polyacetal carboxylate particles, therefore, commonly separate from detergent particles in the detergent box, resulting in a substantially non-uniform dispersion of polyacetal carboxylate throughout the detergent box.

Further, centrifuging of polyacetal carboxylate precipitated from the slurry is a very expensive operation, requiring excessive maintenance cost for operating equipment. It is also difficult to seal the centrifuge from air permeation. Since the centrifuged mixture contains methanol, the presence of air permitted by leakage through an ineffective seal creates a risk of explosion. Moreover, the standard drying steps entail introduction of heat to induce drying within reasonable times. Application of heat not only adds to energy costs, but involves still further expense because excessive care is required in handling the washed, centrifuged precipitate which contains highly flammable residual methanol.

In addition, polyacetal carboxylate has been found to be very temperature sensitive. Accordingly, addition of heat to induce drying often discolors the product, turning it yellow or brown. It is preferable from an aesthetic standpoint that the polyacetal carboxylate retain its white color so that a visually appealing product can be incorporated directly into detergent. Moreover, if a particular color of builder is desired, this is most readily and reliably achieved by dying a white polyacetal carboxylate. Yellow or brown color bodies in the product may interfere with the color of the dye.

Moreover, in view of the time constraints imposed by the cleaning cycles of, for example, clothes washers and dish washers, it is also desirable that the polyacetal carboxylate composition dissolve in water relatively rapidly.

SUMMARY OF THE INVENTION

Among the several objects of the present invention, therefore, may be noted the provision of a method for preparing a solid particulate polyacetal carboxylate mixture of substantially uniform size; the provision of such method which does not significantly discolor the solid particulate polyacetal carboxylate mixture; the provision of such method which can be operated at relatively low cost and has relatively low labor requirements; the provision of a method for preparing a solid particulate polyacetal carboxylate mixture which may be directly dry mixed into a particulate detergent formulation to produce a uniform product that resists separation of detergent and builder particles; the provision of a composition which may be agglomerated to producea solid particulate polyacetal carboxylate mixture of substantially uniform size; the provision of an agglomerated solid particulate polyacetal carboxylate mixture of substantially uniform size; and the provision of an agglomerated solid particulate polyacetal carboxylate mixture of substantially uniform size that dissolves in water relatively rapidly.

Briefly, therefore, the present invention is directed to a method for preparation of solid particulate polyacetal carboxylate. The method comprises agglomerating a solution comprising less than about 1% by weight methanol and between about 30% by weight and about 60% by weight polyacetal carboxylate onto a substrate to produce a free-flowing particulate solid. The solid comprises between about 30% by weight and about 55% by weight polyacetal carboxylate. The polyacetal carboxylate corresponds to the formula:

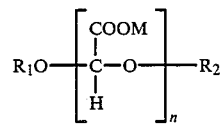

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain.

The present invention is also directed to a method for agglomerating a polyacetal carboxylate onto a substrate. The method comprises preparing a concentrate by removing methanol and water from a mixture comprising between about 6% by weight and about 15% by weight methanol, between about 45% by weight and about 70% by weight water, and between about 20% by weight and about 40% by weight polyacetal carboxylate. The proportions of methanol and water removed from the mixture are such that the concentrate constitutes a gel at room temperature and an aqueous liquid solution at elevated temperature. The concentrate comprises the polyacetal carboxylate. The polyacetal carboxylate corresponds to the formula:

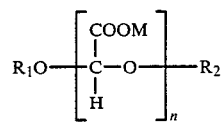

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain. A substrate is contacted with a gel-forming agglomerating solution, the solution comprising the concentrate in its liquid state, to agglomerate the polyacetal carboxylate onto the substrate to produce a free-flowing particulate solid agglomerate comprising between about 30% by weight and about 55% by weight polyacetal carboxylate.

The present invention is further directed to a method for preparation of solid particulate polyacetal carboxylate. The method comprises preparing a concentrate by removing methanol and water from a mixture comprising between about 6% by weight and about 15% by weight methanol, between about 45% by weight and about 70% by weight water, and between about 20% by weight and about 40% by weight polyacetal carboxylate. The proportions of methanol and water removed from the mixture are such that the concentrate constitutes a gel at room temperature and an aqueous liquid solution at elevated temperature. The concentrate comprises the polyacetal carboxylate. The polyacetal carboxylate corresponds to the formula:

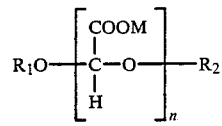

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms tetraalkyl ammonium groups, and alkanolamine groups having from 1 to about 4 carbon atoms in the alkyl chain. A substrate is contacted with a gel-forming agglomerating solution, the solution comprising the concentrate in its liquid state, to agglomerate the polyacetal carboxylate onto the substrate to produce a free-flowing particulate solid agglomerate comprising between about 30% by weight and about 55% by weight polyacetal carboxylate. At least about 95% by weight of the solid is in the form of particles between about 100 mesh and about 10 mesh in size.

The present invention is also directed to a gel comprising between about 40% by weight and about 70% by weight water, less than about 1% by weight methanol and between about 30% by weight and about 60% by weight polyacetal carboxylate corresponding to the formula:

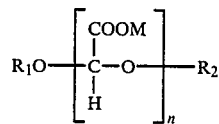

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain.

The present invention is further directed to a particulate solid comprising a polyacetal carboxylate agglomerated onto a substrate. The polyacetal carboxylate corresponds to the formula:

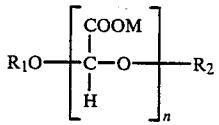

where n is at least about 4 and represents the average chain length of the polyacetal carboxylate in the mixture, $R_1$ and $R_2$ are stabilizing end groups independently selected from chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain. The solid has a polyacetal carboxylate concentration of between about 40% and about 50%, and at least about 95% of the solid is in the form of particles between about 100 mesh and about 10 mesh in size.

The present invention is also directed to a method for preparation of particulate polyacetal carboxylate, comprising spray agglomerating a solid particulate acetal carboxylate mixture with a liquid binding agent selected from the group consisting of water and aqueous alkali metal silicate solutions. The solid particulate acetal carboxylate mixture comprises between about 75% by weight and about 85% by weight polyacetal carboxylate of the form

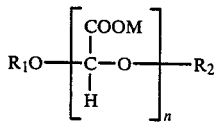

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain, thereby producing a solid particulate polyacetal carboxylate mixture comprising at least about 70% by weight polyacetal carboxylate.

Other objects and features of this invention will be in part apparent and in part pointed out hereinafter.

DETAILED DESCRIPTION OF THE PREFERRED EMBODIMENTS

In accordance with this invention, a process has been discovered by which particulate polyacetal carboxylate compositions of substantially uniform size can be prepared without simultaneous production of a substantial amount of very small particles. Moreover, this process is not as labor intensive as prior art processes and avoids the application of extreme heat that tends to discolor the polyacetal carboxylate. Thus, the product of the process is white; or a product of a true desired color may be produced by incorporation of a dye. Surprisingly, it has also been found that a higher rate of dissolution in water is exhibited by a dry mixture of detergent and polyacetal carboxylate of the desired uniform size distribution than by a mixture containing a substantial fraction of either oversize or undersize polyacetal carboxylate particles.

In the method, methanol and water are removed from an aqueous mixture typically formed in the manufacture of polyacetal carboxylate. The aqueous mixture is a slurry comprising between about 6% by weight and about 15% by weight methanol and between about 20% by weight and about 40% by weight polyacetal carboxylate.

The alcohol and water preferably are removed by heating the aqueous mixture until a clear solution is formed. If so desired for ease of storage and transport, the solution may be allowed to cool to room temperature. Upon cooling to room temperature, the solution turns to a semi-solid, gelatinous form, or a "gel". Although many gels form colloidal solutions when heated, it has been found that when the gel of this invention is heated, the gel returns to the noncolloidal solution phase from which the gel was formed. Accordingly, the concentrate prepared from the slurry can take the form of a liquid solution phase or a gel phase produced by cooling the liquid phase. The liquid phase can be prepared directly by distillation of the slurry, or by heating the gel phase. Thus, when the particulate solid is desired to be formed, the gel may be heated or, since the gel has been found to be thixotropic, stirred, to return it to the solution phase which is then agglomerated onto a substrate to produce a free-flowing particulate solid comprising between about 30% by weight and about 55% by weight active polyacetal carboxylate, and at least about 95% by weight, generally about 98% by weight, of said solid is in the form of particles between about 100 mesh and about 10 mesh in size, typically between about 100 mesh and about 40 mesh in size.

Such particulate polyacetal carboxylate compositions may be mixed directly into commercial particulate detergent formulations. The particulate polyacetal carboxylate composition substantially avoids the tendency to separate from the detergent particles during storage and transport of the commercial formulation. Moreover, it has been found that polyacetal carboxylate compositions substantially of particles within such intermediate size range dissolves more rapidly than does a polyacetal carboxylate compostion in which a substantial portion of the particles are outside the range.

Even if the polyacetal carboxylate slurry has been treated by the prior art process, that is, methanol precipitation, centrifugation and drying, the above-described agglomeration process can still be employed. In particular, water may be added to the centrifuged, dried polyacetal carboxylate mixture. If the mixture is heated slightly during the addition of water, a concentrated solution is formed which can be either agglomerated onto a substrate, or cooled to form a gel. The gel can be heated at a later time to form a solution for agglomeration onto the substrate. If the mixture is not initially heated, water is added until a gel is formed. Whichever of these methods is employed, the mixture is stirred during addition of the water and until the solution or gel is formed. If the degree of stirring is low and heat is not added, a gel forms. The gel is then heated to provide an agglomeration solution for use in the agglomeration process as described above.

Another technique also provides a means of treatment of polyacetal carboxylate after the centrifuging and drying steps of the prior art. In this technique, the polyacetal carboxylate is spray agglomerated with standard binders such as water, but preferably aqueous liquid silicates, to form a particulate solid in the form of particles between about 100 mesh and about 10 mesh in size.

In the conventional manufacture of polyacetal carboxylate for use in dry particulate detergent formulations, the polyacetal carboxylate is typically prepared in a slurry comprising between about 20% by weight and about 40% by weight polyacetal carboxylate, between about 6% by weight and about 15% by weight methanol, between about 45% by weight and about 70% by weight water, between about 0.5% by weight and about 4% by weight sodium carbonate included as a pH buffer to maintain stability of the polyacetal carboxylate and to improve the detergent qualities of the formulation, up to about 4% by weight sodium oxalate salt or sodium glyoxylate resulting from side reactions, such as the Cannizarro reaction, during preparation of polyacetal carboxylate, and up to about 4% by weight sodium hydroxide. The slurry may be produced as described in U.S. Pat. No. 4,140,676 by saponification of a polyacetal carboxylate ester. The polyacetal carboxylate is of the form

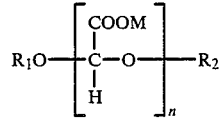

where n is at least about 4, preferably between about 10 and about 400, more preferably between about 10 and about 200, and most preferably between about 50 and about 120, and represents the average chain length of the polyacetal carboxylate in the mixture, $R_1$ and $R_2$ are stabilizing end groups, and M is an alkali metal, ammonium, an alkyl group of 1 to about 4 carbon atoms, a tetraalkyl ammonium group, or an alkanolamine group having from 1 to about 4 carbon atoms in the alkyl chain. The stabilizing ends groups, $R_1$ and $R_2$, are independently selected chemically stable groups that stabilize the polymer against rapid depolymerization in alkaline solution. Particularly suitable end groups are noted in U.S. Pat. No. 4,144,226 to Crutchfield et al. Preferably, each of the stabilizing end groups is derived from ethyl vinyl ether (EVE) and the alkali metal is sodium.

Conventionally, methanol is added to the slurry to induce precipitation of the polyacetal carboxylate. The precipitated polyacetal carboxylate is removed by centrifugation and then dried, typically by addition of heat. However, in the method of the present invention, precipitation by addition of methanol, centrifugation and high temperature drying may be avoided. Instead, as noted above, water and methanol are removed from the slurry by distillation thereby forming a solution. The solution may be directly agglomerated onto a substrate, or allowed to cool to room temperature to form a gel for storage. If the gel is formed, when the agglomeration is desired to be carried out, the gel is first heated to return it to the solution state, and the resulting agglomeration solution is then agglomerated onto a substrate.

Alternatively, if conventional precipitation, centrifugation and drying have been carried out, a particulate polyacetal carboxylate composition of substantially uniform size can be prepared by any of several methods. The builder prepared by precipitation, centrifugation and drying of the slurry can be heated to between about 40° C. and about 70° C. and mixed with water to form a concentrate of generally the same composition as the concentrate produced by distilling the slurry as noted above. Then, the concentrate in the aqueous liquid solution state is agglomerated onto a substrate. If desired, before agglomeration, the concentrate may be cooled to form a gel for storage, and at a later time the gel may be heated to between about 40° C. and about 70° C., thereby melting the gel to produce the liquid agglomeration solution form of the concentrate. Then the concentrate is agglomerated onto the substrate. Alternatively, if the builder is not heated during dissolution, the gel is formed directly by the addition of water to the builder. When agglomeration is desired, the gel is heated and agglomeration is carried out as described above. During any of these processes, the builder is stirred during addition of the water to ensure homogeneity. The gel is thixotropic, so formation of the gel as opposed to solution depends on the degree of stirring as well as the addition of heat. According to yet another method, the composition is spray agglomeration with a conventional binding agent.

Distillation of the slurry can been carried out, at least on relatively small scale, by batch distillation without reflux. It is believed that for a large scale process, a continuous multistage distillation column (either packed or plate) may be used in place of the batch still. The batch still is operated at a vacuum overhead of between about 200 mmHg abs. and about 450 mmHg abs., and at a pot temperature of between about 40° C. and about 70° C., preferably about 60° C. Distillation is continued until the slurry becomes a clear solution. If it is desired that a gelatinous mass be obtained, such as for convenient storage or for particular considerations in transportation prior to agglomeration, or that if it is desired that heating of the solution not be maintained, the solution may be transformed to the gel by ambient cooling to room temperature. If desired, the gel or the cooling solution may be stored for later processing.

The gel thus produced comprises between about 30% by weight and about 60% by weight, preferably between about 40% by weight and about 50% by weight, polyacetal carboxylate, between about 0.1% by weight and about 1% by weight methanol, between about 2% by weight and about 5% by weight sodium carbonate, up to about 1% trace impurities such as oxalate salts and glyoxylates. Water makes up the remainder of the gel.

In preparation for agglomeration, the gelatinous mass is reheated to the melting point of the gel, generally between about 40° C. and about 70° C., to return the gel to solution form. The solution, whether obtained directly from the distillation step, or derived from gel, is maintained at a temperature at, or just above, the melting point of the gel, and then agglomerated onto a particulate substrate by rotating drum agglomeration, vertical agglomeration or, preferably, fluidized bed agglomeration.

The particulate substrate can be comprised of any of a number of solids, but a hygroscopic solid, such as an alkali metal carbonate, is preferred so that the substrate may be hydrated by water from the solution. It is also preferable that the substrate be compatible with a detergent mixture so that it does not hinder the detergent action, react with the detergent or harm the materials to be cleaned by the detergent. Accordingly, it is especially preferred that the substrate be a substance ordinarily found in detergent mixtures. Thus, preferred substrates include sodium carbonate and sodium sulfate. During agglomeration, the hygroscopic substrate will tend to hydrate, thereby absorbing water. Sodium carbonate forms mono-, hepta-, and decahydrates, while sodium sulfate forms hepta- and decahydrates. The most stable forms are sodium carbonate monohydrate and sodium sulfate heptahydrate. However, most of the water from the solution tends to evaporate during agglomeration. Fluidized bed agglomeration aids evaporation by circulation of warm (between about 40° C. and about 80° C.) air. Zeoliee, while it does not hydrate, also has been found to form an acceptable substrate. It is believed that the zeolite particles act as "sites" for initiation of agglomeration.

It is also preferred that the particle size of the carbonate or sulfate substrate is the same as is used in commercial grade detergent material. Zeolite particles are usually on the order of 1 micron. Size control can be ensured by sieving the particulate substrate before agglomeration.

The polyacetal polycarboxylate composition produced by agglomeration comprises a particulate solid. Some of the composition particles comprise polyacetal carboxylate mixture encapsulating a particle of substrate, while other composition particles comprise several substrate particles coated by a matrix of polyacetal carboxylate mixture. Some of the water from the solution evaporates during the agglomeration, particularly during warm air circulation involved in fluidized bed agglomeration, such that the composition agglomerated onto the substrate contains only between about 6% by weight and about 12% by weight water. Water remaining in the composition after agglomeration is generally in the form of water of hydration as well as free water.

The polyacetal carboxylate mixture encapsulating or coating the substrate comprises between about 75% by weight and about 85% by weight, preferably between about 76% by weight and about 82% by weight, polyacetal carboxylate such as sodium polyglyoxylate, between about 0.2% by weight and about 1% by weight monomeric glyoxylate, between about 6% by weight and about 12% by weight water and other volatiles, between about 2% by weight and about 5% by weight sodium carbonate, between about 0.5% by weight and about 1.5% by weight oxalate salt, and trace amounts of sodium glycolate and sodium formate. The particulate composition produced by the agglomeration comprises between about 50% by weight and about 60% by weight of the polyacetal carboxylate mixture while substrate forms the remainder, between about 40% by weight and about 50% by weight. Since the agglomerated composition comprises between about 50% by weight and about 60% by weight polyacetal carboxylate mixture, which in turn comprises between about 75% by weight and about 85% by weight polyacetal carboxylate, the agglomerated composition comprises between about 40% by weight and about 50% by weight polyacetal carboxylate.

It has been found that nearly all of the polyacetal carboxylate mixture undergoing the agglomeration can be actually agglomerated onto the substrate by this method. Not only that, but an agglomeration product can be produced that is a composition comprising at least about 95% by weight, and generally about 98% by weight, particles within the range of from about 100 mesh to about 10 mesh. Moreover, least about 80% by weight, typically at least about 90% by weight, of the particles are within the range of from about 100 mesh to about 40 mesh. Thus, very little of the agglomerated polyacetal carboxylate composition is in the form of dust-like particles. If desired, however, the polyacetal carboxylate composition can be sieved to produce a particulate solid having a particle size distribution almost entirely within the desired range of from about 100 mesh to about 10 mesh, preferably from about 100 mesh to about 40 mesh. The loose bulk density of the agglomerated particulate solid has been found to be between about 0.5 g/cc and about 1.0 g/cc.

According to the spray agglomeration technique, the solid particulate polyacetal carboxylate mixture conventionally produced from a slurry by precipitation with methanol, centrifugation, washing and drying can be treated to produce a particulate solid of acceptable particle size and acceptable density without use of heat which tends to discolor the polyacetal carboxylate. This technique involves spray agglomerating conventionally produced polyacetal carboxylate mixture with a binding agent.

Such conventional particulate polyacetal carboxylate mixture comprises between about 75% by weight and about 85% by weight, preferably between about 76% by weight and about 82% by weight, polyacetal carboxylate such as sodium polyglyoxylate, between about 0.2% by weight and about 1% by weight monomeric glyoxylate, between about 6% by weight and about 12% by weight water and other volatiles, between about 2% by weight and about 5% by weight sodium carbonate, between about 0.5% by weight and about 1.5% by weight oxalate salt, and trace amounts of sodium glycolate and sodium formate.

This mixture is spray agglomerated with a conventional binding agent that is compatible with the detergent. The proportion by weight of mixture to binding agent is between about 25:1 and about 10:1. The binding agents considered are such compositions that will tend to "share" water of hydration with, or increase hydration of, the polyacetal carboxylate mixture. Such agents include water and liquid silicates, particularly alkali metal silicate solutions, preferably sodium silicate solution. Such sodium silicate solution comprises between about 30% by weight and about 50% by weight, preferably between about 40% by weight and about 50% by weight, solids in a proportion of about 2 to about 3.22 part by weight silica per one part by weight sodium monoxide ($SiO_2$: $Na_2O$). The remainder of the solution is water. In preparation for spray agglomeration, where the binding agent is a silicate solution, the solution is heated to at least about 35° C. but generally below about 80° C. to reduce its viscosity, and sprayed over a moving bed of polyacetal carboxylate mixture particles.

The agglomerated polyacetal carboxylate composition thus produced comprises at least about 70% by weight polyacetal carboxylate of the form

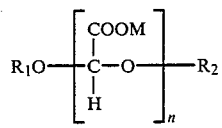

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain. If a liquid silicate is employed as the binding agent, the agglomerated mixture further comprises at most about 5% by weight, preferably between about 2% by weight and about 5% by weight, and typically between about 2% by weight and about 3% by weight, silicate salt and between about 1% by weight and about 2% by weight water added during agglomeration. If water is used as the binding agent, the agglomerated mixture does not contain silicate salt, but has a water content between about 1% by weight and about 2% by weight higher than the mixture had before agglomeration. It is believed that most of this additional water is in the form of water of hydration. The particles produced by use of either type of binding agent are substantially between about 100 mesh and about 10 mesh in size, generally between about 100 mesh and about 40 mesh in size. Generally at least about 95% by weight of the particles are within the size range of between about 100 mesh and about 10 mesh, and at least about 80% by weight, typically at least about 90% by weight, of the particles are within the range of from about 100 mesh to about 40 mesh. The loose bulk density is less than about 1 g/cc.

The following examples illustrate the invention.

EXAMPLE 1

A gel containing about 32% by weight sodium polyglyoxylate (average chain length of 58) with end groups derived from ethyl vinyl ether (EVE), about 2% by weight sodium carbonate, about 1.5% by weight oxalate salt, and about 63% by weight water, was heated until the gel turned liquid. The liquid was spray agglomerated onto various substrates by a 1 kg. batch process in a fluidized bed agglomerator, with the spray entering from above the bed. In separate runs, the substrate was sodium carbonate, sodium sulfate, zeolite, sodium silicate, a cabbonate/sulfate mixture and a combined mixture of all four substrates.

Analyses of the products of the agglomeration indicated that the sodium polyglyoxylate (NaGx) content of the agglomerated particles was between about 25% by weight and about 60% by weight. The product from each run was comprised of larger and lower density particles than the granular products of conventional methods.

The sequestration of the agglomerates, i.e., the ability of the agglomerates to sequester calcium ions, was measured and compared to the expected sequestration by an equivalent amount of sodium tripolyphosphate (STP) and the theoretical value for the same amount of unagglomerated sodium polyglyoxylate. The following results were obtained:

| Substrate | NaGx in sample (wgt. %) | Sequestration (% vs. STP) | Theoretical Sequestrat'n (% vs. STP) |
| --- | --- | --- | --- |
| $Na_2CO_3$ | 37.5 | 58 | 57.7 |
| $Na_2CO_3$ | 56.0 | 65 | 93.7 |
| $Na_2SO_4$ | 40.3 | 62 | 63.1 |
| $Na_2SO_4$ | 30.3 | 47 | 43.6 |
| Zeolite | 44.7 | 98 | 71.7 |
| Zeolite | 42.4 | 94 | 67.2 |
| Na silicate | 26.2 | 43 | 35.6 |
| Na silicate | 36.4 | 53 | 55.5 |
| $Na_2CO_3$/ $Na_2SO_4$ | 39.4 | 56 | 61.4 |

The loose bulk density of the agglomerates ranged from about 0.48 to about 0.81 g/cc. It appeared that the density could be controlled by varying the agglomeration operating conditions, such as duration of agglomeration. The particle size distribution compared favorably with samples of conventional grnaular polyacetal carboxylate mixtures which were vacuum dried and milled. The loose bulk density of those samples was found to be 0.98 g/cc+/−0.02 g/cc. The packed density was 1.13 g/cc+/−0.03 g/cc.

The particle size distribution of the agglomerates was measured and percentage by weight of particles of each size was determined. The results were as follows:

| Components | +10 | +20 | Mesh Size: +40 | +60 | −60 |
| --- | --- | --- | --- | --- | --- |
| $Na_2CO_3$ | 49.5 | 39.4 | 8.0 | 2.1 | 1.0 |
| $Na_2CO_3$ | 30.2 | 29.3 | 31.3 | 6.7 | 2.5 |
| $Na_2SO_4$ | 71.0 | 19.4 | 5.4 | 2.3 | 1.9 |
| $Na_2SO_4$ | 23.3 | 35.1 | 18.4 | 13.8 | 9.3 |
| Zeolite | 4.6 | 73.6 | 12.9 | 2.8 | 6.1 |
| Zeolite | 47.2 | 36.0 | 8.4 | 2.5 | 5.9 |
| Na silicate | 69.9 | 27.6 | 2.1 | 0.2 | 0.2 |
| Na silicate | 36.9 | 50.7 | 6.0 | 0.7 | 5.7 |
| $Na_2CO_3$/ $Na_2SO_4$ | 35.1 | 62.6 | 1.4 | 0.5 | 0.4 |

Since the agglomeration residence times and other conditions were not controlled, the above particle size results are not believed to be indicative of what would be produced in larger scale equipment. It is believed that a larger scale agglomerator would result in a more uniform particle size.

Nevertheless, this particle size distribution compares favorably with samples of conventional granular polyacetal carboxylate mixtures which were vacuum dried and milled. The particle size distribution for this standard granular polyacetal carboxylate mixture was as follows:

| Mesh Size Range | Average Weight % in the Mesh Size Range | Range of Weight % for the Samples |
|---|---|---|
| +40 | 22.5 | 10–30 |
| −40/+60 | 31.7 | 25–40 |
| −60/+80 | 18.5 | 15–30 |
| −80/+100 | 9.0 | 5–15 |
| −100 | 18.3 | 10–25 |

EXAMPLE 2

Several tests were conducted on agglomerates prepared as described in Example 1.

Frangibility tests showed the agglomerated particles to be very difficult to fracture. The color of the agglomerates ranged from white to tan, with the sodium carbonate agglomerates the lightest in color. However, it appeared that the temperature to which the gel was heated, the time the gel was maintained at that temperature and the fluidizing air temperature influenced the color more than did the nature of the substrate.

The rates of solution of the agglomerates were measured to determine whether the agglomerates would dissolve quickly enough to be commercially practical. All agglomerates except the agglomerate on the sodium sulfate substrate showed 90% by weight dissolution within five minutes.

Samples of the agglomerates were subjected to 75% relative humidity and 49° C. for two weeks. The weight gained by the samples was similar to previously determined values for dry-mixed samples of unagglomerated polyacetal carboxylate.

EXAMPLE 3

The rates of solubility of polyacetal carboxylate compositions in water were measured by measuring the rates of disappearance (sequestration) of Ca+2 ions in calcium chloride solution. For each of the tests, an aqueous solution (1 liter) of Ca+2 was prepared by dilution of a standard calcium solution to a Ca+2 concentration of 200 ppm. A Ca+2 specific electrode was calibrated for sequestration measurements with 200 ppm, 20 ppm and 2 ppm Ca+2 solutions, as opposed to the 100 ppm, 10 ppm and 1 ppm Ca+2 solutions of the standard calibration method. In the standard method, the potential difference between a working electrode and a reference electrode in a test solution is measured, as is the potential difference between a working electrode and a reference electrode in a standard solution. The difference between the potential differences is then determined. By the method, the difference between the 100 ppm solution and 10 ppm solution is 28 millivolts. The pH of each of the 200 ppm Ca+2 test solutions was adjusted to 10, or slightly more, by addition of 0.5N sodium hydroxide solution. Conventionally produced polyacetal carboxylate composition was screened and a sample (0.6 g) consisting of particles within a designated size range was added to each test solution with enough agitation to produce a small vortex at the surface of the solution. The potential difference between the working and reference electrodes in the solution was measured against time, as a measure of the rate of solubility, i.e., that rate at which the polyacetal carboxylate composition dissolved in water. The results as measured in total change (in millivolts) from initial reading at the noted lengths of time (in min.) after addition of the sample to the solution were as follows for each sample consisting of particles in the following mesh size ranges:

| | Particle Size Range | | | | | | |
|---|---|---|---|---|---|---|---|
| Time | −14/+20 | −20/+40 | −40/+60 | −60/+80 | −80/+100 | −100/+325 | −325 |
| 0.5 | — | 0.4 | 3.6 | 15.2 | 18.0 | 28.8 | 0.4 |
| 1.0 | 1.6 | 1.6 | 11.2 | 34.0 | 43.2 | 36.8 | 0.4 |
| 1.5 | 2.8 | — | — | 63.2 | 65.2 | 38.8 | 1.2 |
| 2.0 | 3.6 | 4.4 | 30.4 | 67.2 | 65.2 | 39.6 | 2.0 |
| 2.5 | 4.8 | — | — | 67.2 | — | 40.8 | — |
| 3.0 | — | 9.6 | 64.4 | 67.2 | 65.2 | 41.6 | 3.6 |
| 3.5 | 7.6 | — | 69.2 | 67.2 | — | 42.8 | — |
| 4.0 | 9.2 | 16.4 | 69.2 | 67.2 | 65.2 | 44.0 | 6.8 |
| 5.0 | 12.8 | 26.0 | 69.2 | 67.2 | 65.2 | 45.6 | 10.8 |
| 6.0 | 17.6 | 41.6 | | | | 47.6 | 16.4 |
| 7.0 | 23.2 | 57.6 | | | | 49.6 | 21.2 |
| 8.0 | 33.2 | 68.4 | | | | 51.2 | 26.8 |
| 9.0 | 45.2 | 71.6 | | | | 52.8 | 32.4 |
| 10.0 | 56.8 | 72.0 | | | | 54.4 | 37.6 |
| 11.0 | 65.6 | | | | | 55.6 | 44.4 |
| 12.0 | 70.0 | | | | | 57.2 | 49.6 |
| 13.0 | | | | | | | 52.4 |

In view of the above, it will be seen that the several objects of the invention are achieved and other advantageous results attained.

As various changes could be made in the above processes and compositions without departing from the scope of the invention, it is intended that all matter contained in the above description or shown in the accompanying drawings shall be interpreted as illustrative and not in a limiting sense.

What is claimed is:

1. A method for preparation of solid particulate polyacetal carboxylate, the method comprising agglomerating an aqueous solution comprising less than about 1% by weight methanol and between about 30% by weight and about 60% by weight polyacetal carboxylate onto a substrate to produce a free-flowing particulate solid comprising between about 30% by weight and about 55% by weight said polyacetal carboxylate, said polyacetal carboxylate corresponding to the formula:

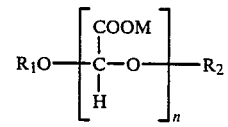

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain.

2. A method as set forth in claim 1 wherein said solution is derived from a gel.

3. A method as set forth in claim 2 wherein said solution is derived from said gel by heating said gel sufficiently to transform said gel to a liquid phase.

4. A method as set forth in claim 2 wherein said substrate comprises a particulate hygroscopic solid.

5. A method as set forth in claim 2 wherein said substrate is selected from a group consisting of sodium carbonate, sodium sulfate and zeolite.

6. A method as set forth in claim 2 wherein M is sodium.

7. A method as set forth in claim 6 wherein said $R_1$ and $R_2$ are each derived from ethyl vinyl ether.

8. A method as set forth in claim 1 wherein said solution is produced by removing methanol and water from a mixture comprising between about 6% by weight and about 15% by weight methanol, between about 45% by weight and about 70% by weight water, and between about 20% by weight and about 40% by weight said polyacetal carboxylate.

9. A method for agglomerating a polyacetal carboxylate onto a substrate, the method comprising:

preparing a concentrate by removing methanol and water from a mixture comprising between about 6% by weight and about 15% by weight methanol, between about 45% by weight and about 70% by weight water, and between about 20% by weight and about 40% by weight polyacetal carboxylate, the proportions of methanol and water removed from said mixture being such that said concentrate constitutes a gel at room temperature and an aqueous liquid solution at elevated temperature, said concentrate comprising said polyacetal carboxylate, said polyacetal carboxylate corresponding to the formula:

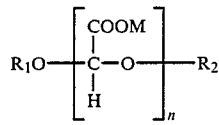

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain; and contacting a substrate with a gel-forming agglomerating solution, said agglomerating solution comprising said concentrate in its liquid solution state, to agglomerate said polyacetal carboxylate onto said substrate to produce a free-flowing particulate solid agglomerate comprising between about 30% by weight and about 55% by weight said polyacetal carboxylate.

10. A method as set forth in claim 9 wherein said agglomerating solution is derived from said gel by heating said gel sufficiently to transform said gel to a liquid phase.

11. A method as set forth in claim 9 wherein said gel comprises between about 30% by weight and about 60% by weight said polyacetal carboxylate and less than about 1% by weight methanol.

12. A method as set forth in claim 9 wherein said substrate comprises a particulate hygroscopic solid.

13. A method as set forth in claim 9 wherein said substrate is selected from a group consisting of sodium carbonate, sodium sulfate and zeolite.

14. A method as set forth in claim 9 wherein said concentrate constitutes an aqueous solution at a temperature between about 40° C. and about 80° C.

15. A method as set forth in claim 9 wherein M is sodium.

16. A method as set forth in claim 15 wherein $R_1$ and $R_2$ are each derived from ethyl vinyl ether.

17. A method as set forth in claim 11 wherein at least about 95% by weight of said solid is in the form of particles between about 100 mesh and about 10 mesh in size.

18. A method as set forth in claim 17 wherein at least about 80% by weight of said solid is in the form of particles between about 100 mesh and about 40 mesh in size.

19. A method as set forth in claim 18 wherein at least about 90% by weight of said solid is in the form of particles between about 100 mesh and about 40 mesh in size.

20. A method for preparation of solid particulate polyacetal carboxylate, the method comprising:

preparing a concentrate by removing methanol and water from a mixture comprising between about 6% by weight and about 15% by weight methanol, between about 45% by weight and about 70% by weight water, and between about 20% by weight and about 40% by weight polyacetal carboxylate, the proportions of methanol and water removed from said mixture being such that said concentrate constitutes a gel at room temperature and an aqueous liquid solution at elevated temperature, said concentrate comprising said polyacetal carboxylate, said polyacetal carboxylate corresponding to the formula:

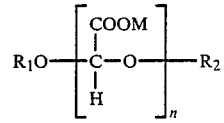

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain; and contacting a substrate with a gel-forming agglomerating solution, said agglomerating solution comprising said concentrate in its liquid solution state, to agglomerate said polyacetal carboxylate onto said substrate to produce a free-flowing particulate solid agglomerate comprising between about 30% by weight and about 55% by weight said polyacetal carboxylate, at least about 95% by weight of said solid being in the form of particles between about 100 mesh and about 10 mesh in size.

21. A method as set forth in claim 20 wherein said agglomerating solution is derived from said gel by heating said gel sufficiently to transform said gel to a liquid phase.

22. A method as set forth in claim 20 wherein at least about 80% by weight of said solid is in the form of particles between about 100 mesh and about 40 mesh in size.

23. A method as set forth in claim 20 wherein at least about 90% by weight of said solid is in the form of particles between about 100 mesh and about 40 mesh in size.

24. A method as set forth in claim 17 wherein said substrate comprises a particulate hygroscopic solid.

25. A method as set forth in claim 20 wherein said substrate is selected from a group consisting of sodium carbonate, sodium sulfate and zeolite.

26. A method as set forth in claim 20 wherein said concentrate constitutes an aqueous solution at a temperature between about 40° C. and about 80° C.

27. A method as set forth in claim 20 wherein M is sodium.

28. A method as set forth in claim 27 wherein said $R_1$ and $R_2$ are each derived from ethyl vinyl ether.

29. A gel comprising between about 40% by weight and about 70% by weight water, less than about 1% by weight methanol and between about 30% by weight and about 60% by weight polyacetal carboxylate corresponding to the formula:

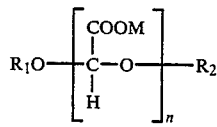

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain.

30. A gel as set forth in claim 29 wherein M is sodium.

31. A gel as set forth in claim 30 wherein $R_1$ and $R_2$ are each derived from ethyl vinyl ether.

32. A gel as set forth in claim 31, further comprising between about 2% by weight and about 5% by weight sodium carbonate.

33. A particulate solid comprising a polyacetal carboxylate agglomerated onto a substrate, said polyacetal carboxylate corresponding to the formula:

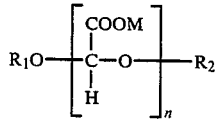

where n is at least about 4 and represents the average chain length of the polyacetal carboxylate in the mixture, $R_1$ and $R_2$ are stabilizing end groups independently selected from chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain, said solid having a polyacetal carboxylate concentration of between about 40% and about 50%, and at least about 95% of said solid being in the form of particles between about 100 mesh and about 10 mesh in size.

34. A particulate solid as set forth in claim 33 wherein at least about 80% by weight of said solid is in the form of particles between about 100 mesh and about 40 mesh in size.

35. A particulate solid as set forth in claim 33 wherein at least about 90% by weight of said solid is in the form of particles between about 100 mesh and about 40 mesh in size.

36. A particulate solid as set forth in claim 33 wherein said substrate comprises a particulate hygroscopic solid.

37. A particulate solid as set forth in claim 33 wherein said substrate is selected from a group consisting of sodium carbonate, sodium sulfate and zeolite.

38. A particulate solid as set forth in claim 33 wherein M is sodium.

39. A particulate solid as set forth in claim 38 wherein $R_1$ and $R_2$ are each derived from ethyl vinyl ether.

40. A method for preparation of particulate polyacetal carboxylate, the method comprising spray agglomerating with a liquid binding agent selected from the group consisting of water and aqueous alkali metal silicate solutions, a solid particulate acetal carboxylate mixture comprising between about 75% by weight and about 85% by weight polyacetal carboxylate of the form

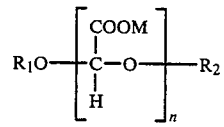

where n is at least about 4 and represents the average chain length of the polyacetal carboxylate in the mixture, $R_1$ and $R_2$ are independently selected chemically stable groups that stabilize the polymer against rapid depolymerization in alkaline solution, and M is selected from the group consisting of alkali metals, ammonium, alkyl groups of 1 to about 4 carbon atoms, tetraalkyl ammonium groups, and alkanolamine groups having from 1 to about 4 carbon atoms in the alkyl chain, thereby producing a solid particulate polyacetal carboxylate mixture comprising at least about 70% by weight said polyacetal carboxylate.

41. A method as set forth in claim 40 wherein the binding agent is an aaqueous alkali metal silicate solution and said solid particulate polyacetal carboxylate mixture further comprises at most about 5% by weight silicate salt.

42. A method as set forth in claim 41 wherein said solid particulate polyacetal carboxylate mixture further comprises between about 2% by weight and about 5% by weight silicate salt.

43. A method as set forth in claim 40 wherein M is sodium.

44. A method as set forth in claim 40 wherein $R_1$ and $R_2$ are each derived from ethyl vinyl ether.

45. A method as set forth in claim 40 wherein said binding agent is a sodium silicate solution.

* * * * *